(12) United States Patent
Vander Linden, III et al.

(10) Patent No.: US 8,075,225 B2
(45) Date of Patent: Dec. 13, 2011

(54) MOVABLE PIPELINE TEE

(76) Inventors: Paul G. Vander Linden, III, Houston, TX (US); Benton F. Baugh, Houston, TX (US)

( * ) Notice: Subject to any disclaimer, the term of this patent is extended or adjusted under 35 U.S.C. 154(b) by 43 days.

(21) Appl. No.: 12/587,364

(22) Filed: Oct. 7, 2009

(65) Prior Publication Data
US 2011/0081203 A1    Apr. 7, 2011

(51) Int. Cl.
*F16L 1/06* (2006.01)
(52) U.S. Cl. ............... 405/184.4; 405/158; 405/169; 405/184.5
(58) Field of Classification Search ............ 405/154.1, 405/158, 169, 172, 184.4, 184.5
See application file for complete search history.

(56) References Cited

U.S. PATENT DOCUMENTS

| | | | | |
|---|---|---|---|---|
| 2,910,835 A | * | 11/1959 | Timothy | 405/166 |
| 3,375,856 A | * | 4/1968 | Howard et al. | 138/106 |
| 3,557,564 A | * | 1/1971 | Hauber | 405/169 |
| 4,022,028 A | * | 5/1977 | Martin | 405/159 |
| 4,116,015 A | * | 9/1978 | Duncan | 405/169 |
| 4,128,219 A | * | 12/1978 | Kaigler et al. | 248/55 |
| 4,140,292 A | * | 2/1979 | Kaigler, Jr. | 405/184.4 |
| 4,218,158 A | * | 8/1980 | Tesson | 405/184.4 |
| 4,268,190 A | * | 5/1981 | Tesson | 405/184.5 |
| 4,705,331 A | * | 11/1987 | Britton | 439/387 |
| 5,575,590 A | * | 11/1996 | Drost et al. | 405/171 |
| 6,450,736 B1 | * | 9/2002 | Eck et al. | 405/184.4 |
| 6,817,808 B1 | * | 11/2004 | Patinet | 405/169 |

* cited by examiner

*Primary Examiner* — Frederic L Lagman

(57) ABSTRACT

The method of protecting two subsea pipelines which cross each other in a subsea environment from damaging one another when subsea currents slide the upper pipeline along the upper surface of the lower pipeline by providing roller around the upper pipeline and rollers around the lower pipeline which are connected together by a rotatable connection which allows the sets of roller to match the angle of the pipeline.

20 Claims, 6 Drawing Sheets

MOVABLE PIPELINE TEE

TECHNICAL FIELD

This invention relates to the general subject of protecting subsea pipelines which cross and may damage one another.

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

The field of this invention is that of the crossing of subsea pipelines and the damage which can happen to them when crossed. The pipeline infrastructure in the Gulf of Mexico (and other places in the world) on a map looks a lot like the road system on land. There are many pipelines, many pipeline intersections, and many pipelines which cross over one another.

The first problem of crossing pipelines is simply than one pipelines on the other can damage the coating on the pipelines and the difference in electrical potential can cause rapid galvanic corrosion on one or other of the pipelines. This problem is conventionally resolved by placing sandbags over the lower pipeline and laying the upper pipeline on the top of the pipelines.

The process of placing sandbags in subsea situations is expensive, and gets more expensive as depths increase.

After the sandbags are in place, if currents increase or the seafloor shifts enough to move the pipelines, the upper pipeline can slide to a location other than where the sandbags are. In the short time this scrapes the coatings off and promotes galvanic corrosion. In the longer term, the sandbags must be moved or replaced at repeated expense.

BRIEF SUMMARY OF THE INVENTION

The object of this invention is to provide a method for separating the upper and lower pipelines to prevent coating damage and resultant corrosion.

A second object of this invention is to provide a method for separating the pipelines which will remain in place if the pipelines are moved by subsea forces.

DETAILED DESCRIPTION OF THE INVENTION

Figure 1:
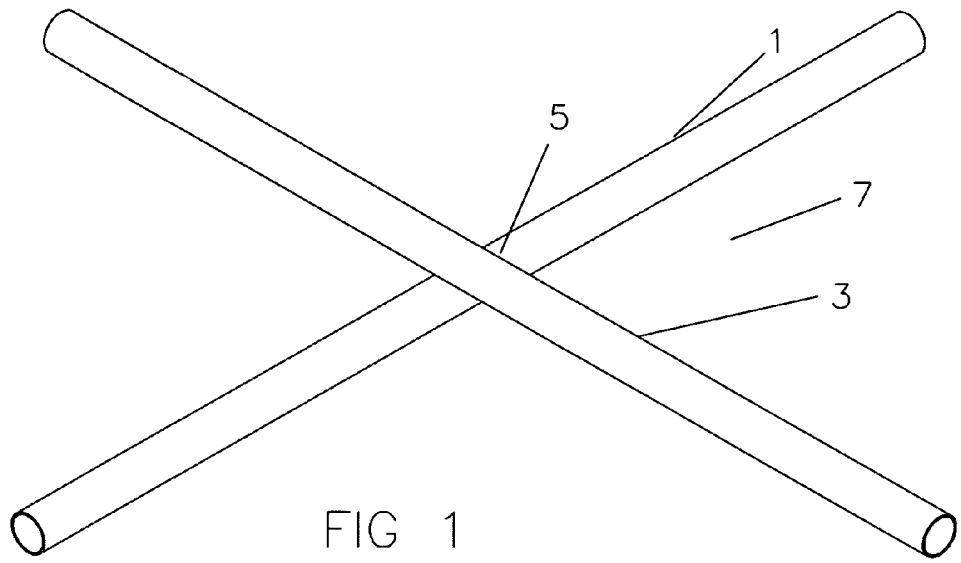
FIG. 1 is a view of pipelines crossing on the seafloor.

Referring now to FIG. 1, a lower pipeline 1 is shown being crossed by an upper pipeline 3 at crossing point 5 on the seafloor 7.

Figure 2:
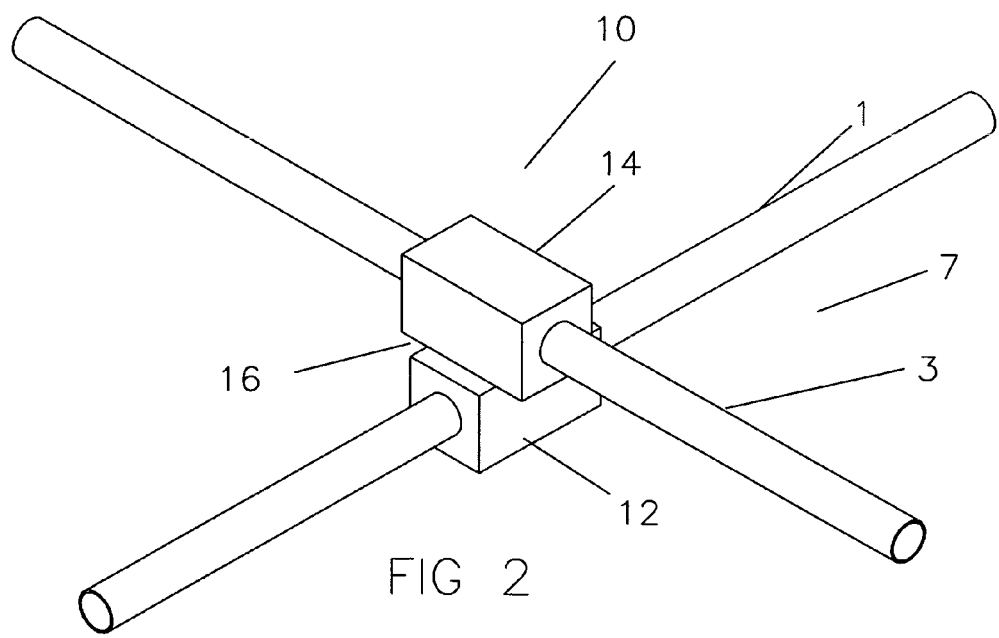
FIG. 2 shows the same pipelines with the pipeline tee of this invention installed.

Referring now to FIG. 2 shows pipeline tee 10 with upper clamp section 12 around upper pipeline 3 and lower clamp section 14 around lower pipeline 1. Upper clamp section 12 and lower pipeline clamp 14 are rotatably connected at 16 to allow the two sections to adjust to the angular orientation of the pipelines.

Figure 3:
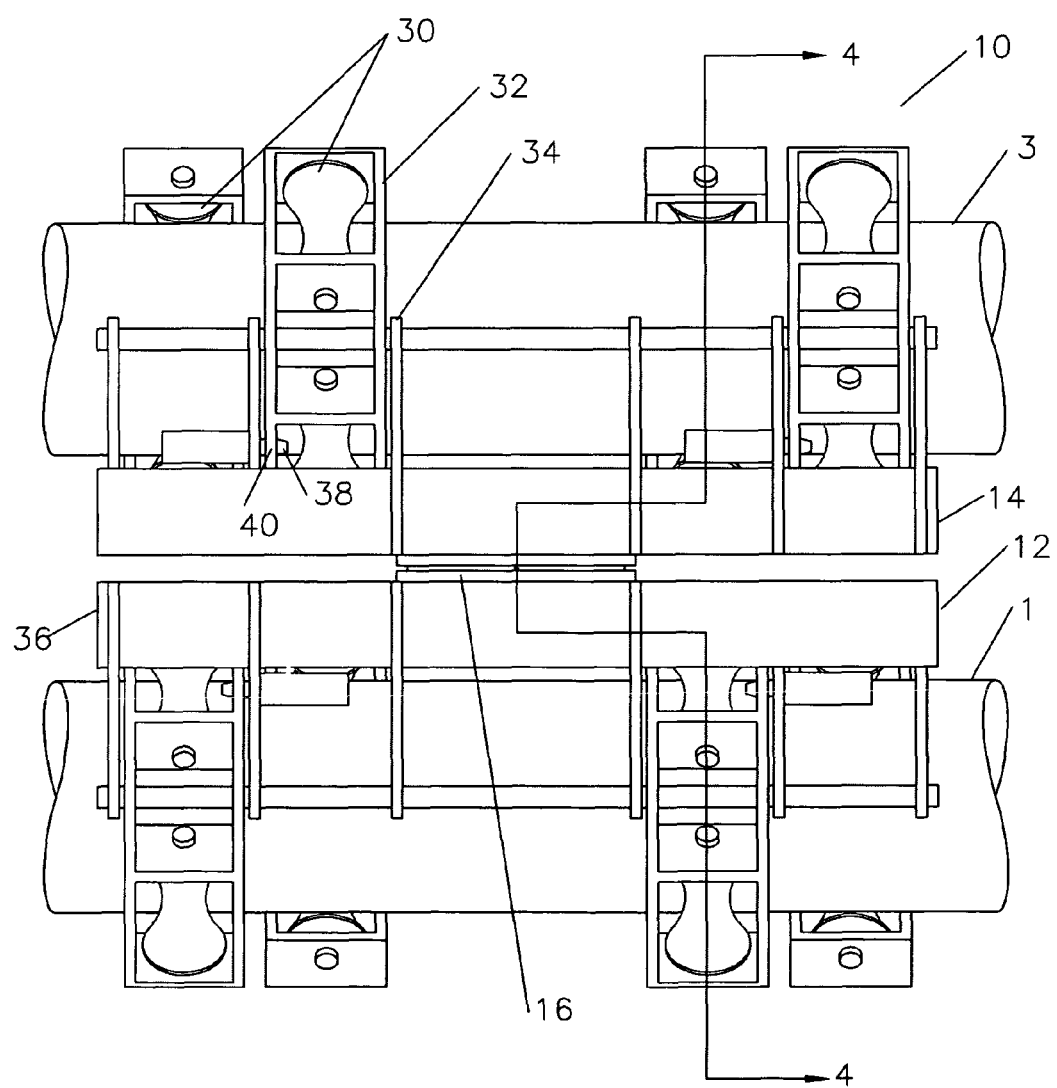
FIG. 3 is a view of the pipeline tee of this invention installed on 2 pipelines, with the pipelines shown as being parallel for convenience of the drawing.

Referring now to FIG. 3 a side view of pipeline tee is shown is the position as would be clamped around the two pipeline if the pipelines were parallel rather than crossing. A multiplicity of rollers 30 are mounted on rockers 32 which are in turn mounted on frames 34 and 36. Spring loaded pins 38 lock into holes 40 when rockers 32 rock to the proper orientation to lock around the pipelines.

Figure 4:
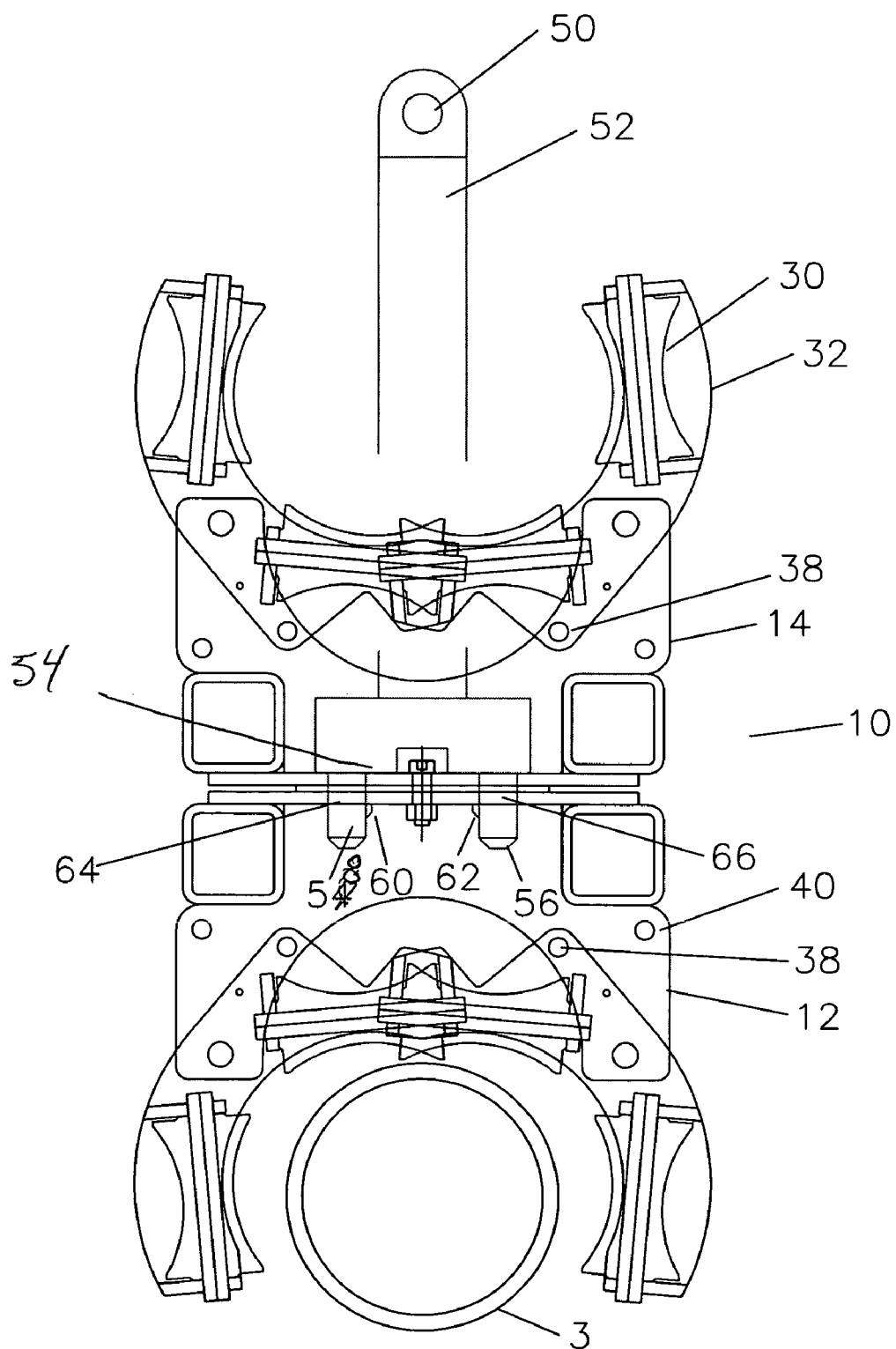
FIG. 4 is a half section taken along lines "4-4" of FIG. 3 showing the pipeline tee in the open position and approaching the upper pipeline.

Referring now to FIG. 4 the pipeline tee 10 is in the open position and is approaching the upper pipeline 3. It is being lowered by a line (not shown) connected at eye 50 of running tool 52. Running tool 52 engages the pipeline tee 10 at 54 with stab pins 56 and 58 which have locking dogs 60 and 62. Upper clamp section 12 is connected to lower clamp section 14 by bolt 64 and is rotatable on bearing 66. The engagement of stab pins 56 and 58 in holes 64 and 66 prevent rotation of upper clamp section 12 by lower clamp section 14 until the running tool 52 is removed.

Figure 5:
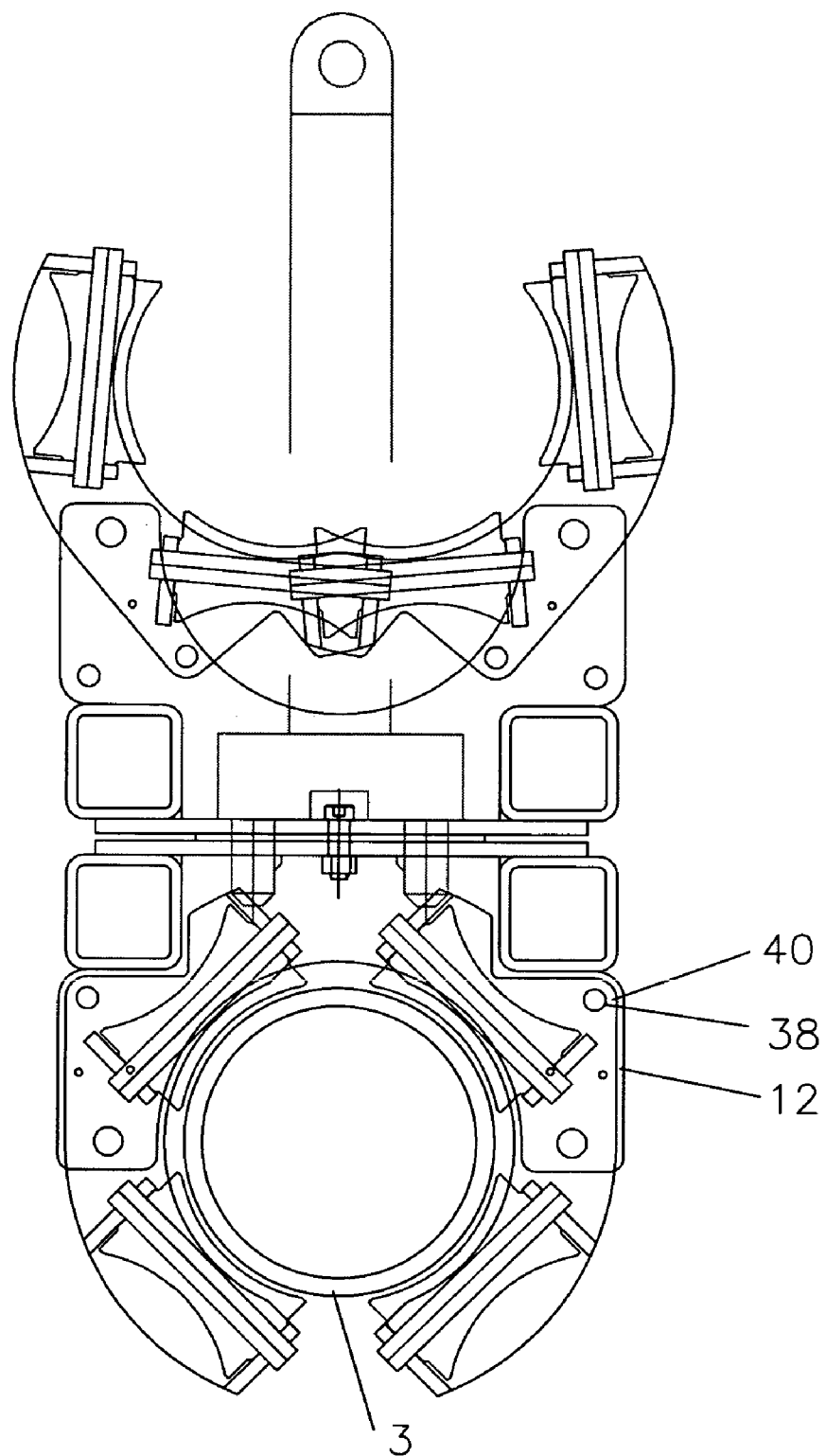
FIG. 5 is the view of FIG. 5 with the lower clamp section closed around the pipeline.

Referring now to FIG. 5, lower clamp section 12 has been lowered onto pipeline 3 until spring loaded pin 38 lines up with hole 40 and automatically locks in place as shown. At this time the running tool 52 is removed and pipeline tee 10 is allowed to rotate 180 degrees on upper pipeline 3.

Figure 6:
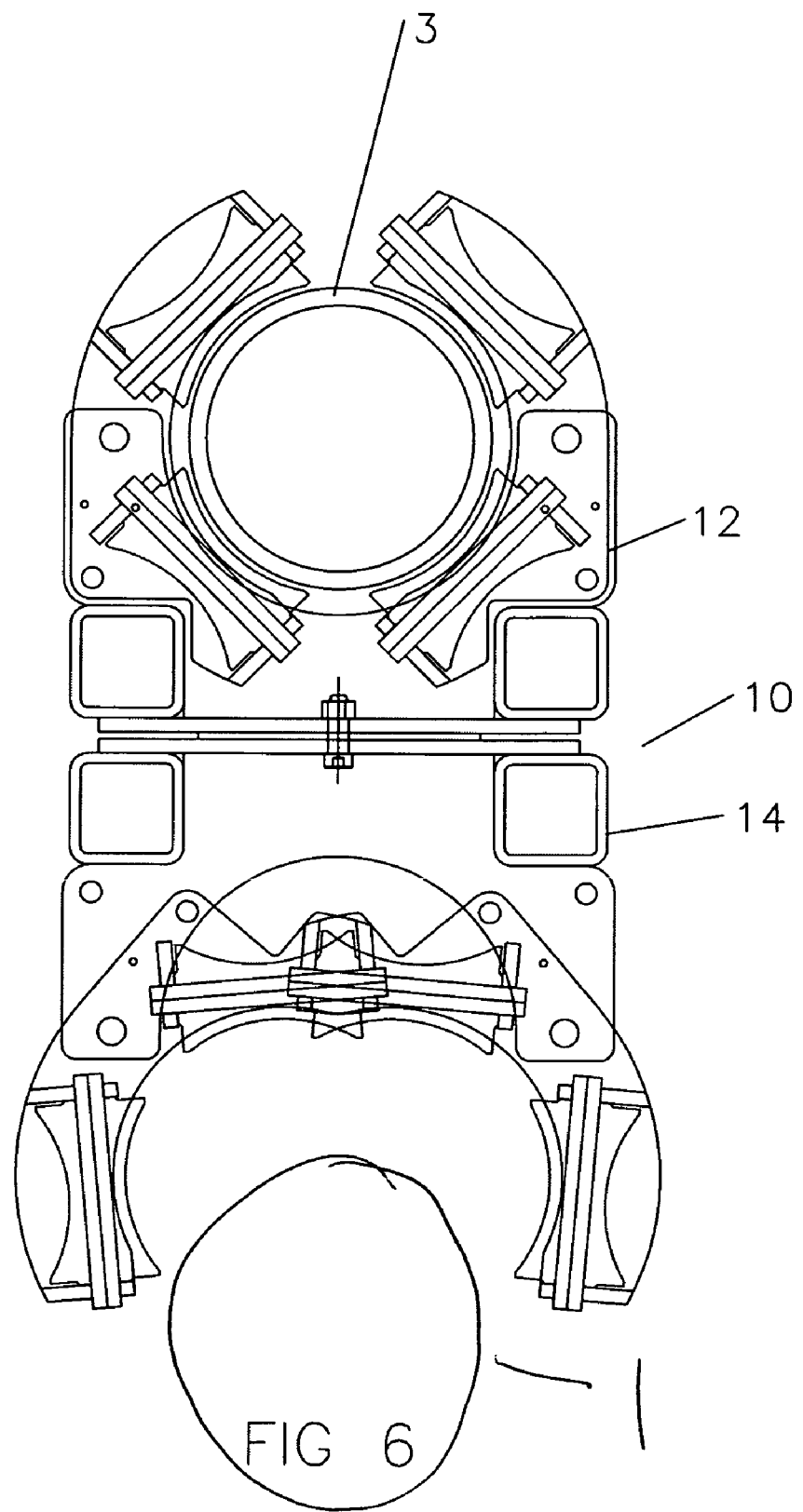
FIG. 6 is the view of FIG. 5 with the pipeline tee turned upside down.

Referring now to FIG. 6 the pipeline tee 10 is shown rotated 180 degrees and now hangs from pipeline 3. At this time the upper clamp section 14 becomes the lower clamp section 14 and the lower clamp section 12 becomes the upper clamp section 14. Lower clamp section 14 is rotated to match the angle of the lower pipeline 1 and upper pipeline 3 is raised enough above lower pipeline 1 to allow the pipeline tee to be moved above the intersection. At that time the upper pipeline 3 is lowered until the pipeline tee 10 engages the lower pipeline 3.

Figure 7:
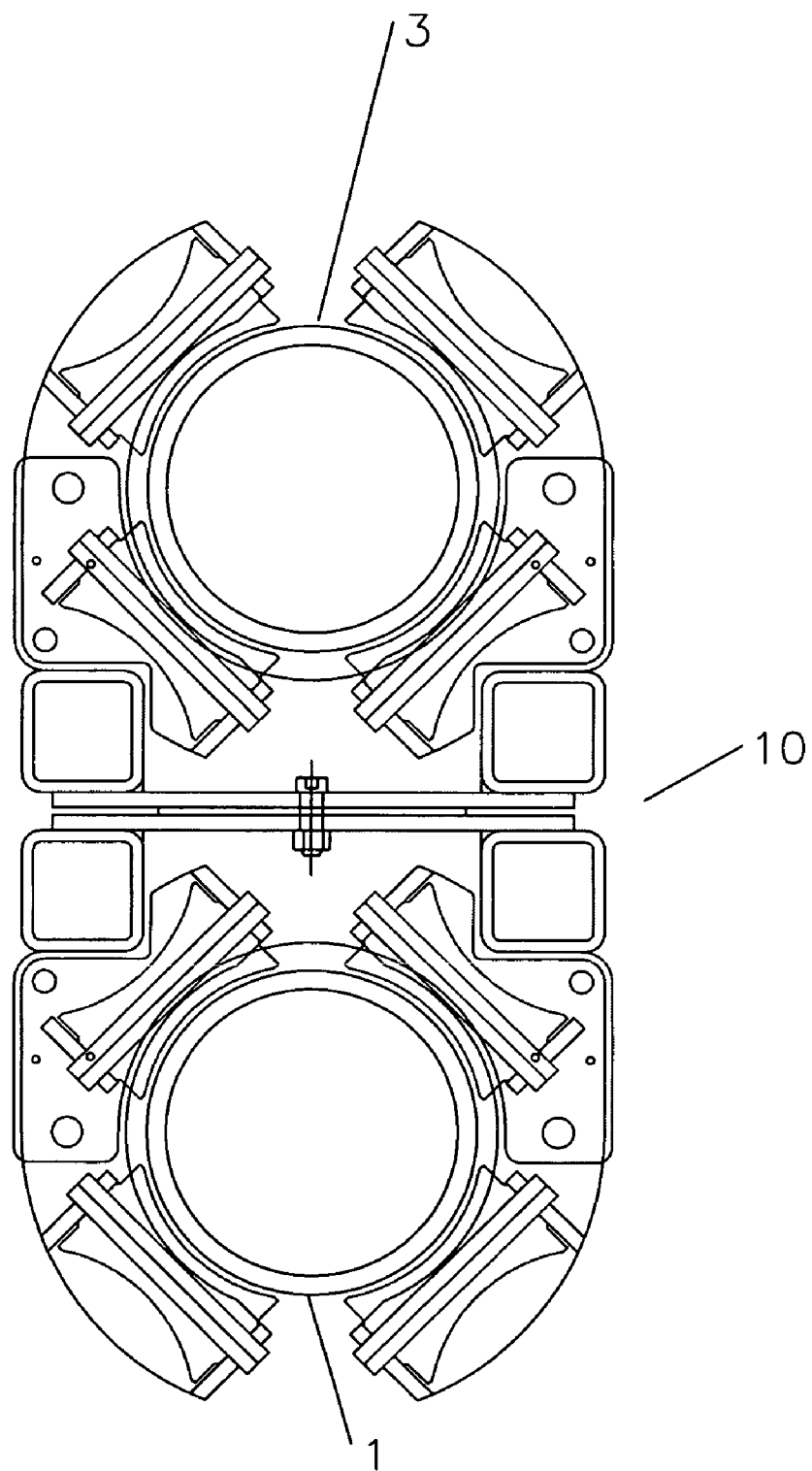
FIG. 7 is the view of FIG. 6 with the presently lower clamp section locked around the lower pipeline.

Referring now to FIG. 7 shows the fully installed pipeline tee 10 on lower pipeline 1 and upper pipeline 3. The figure shows the pipelines as if they were parallel for simplicity of the drawings. The can be at any angle, except perfectly parallel as shown.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. The method of protecting an upper subsea pipeline and a lower subsea pipeline which cross one another from damaging one another, comprising:
providing a upper clamp section around said upper subsea pipeline which is able to move along said upper subsea pipeline without damaging said upper subsea pipeline,
providing a lower clamp section around said lower subsea pipeline which is able to move along said lower subsea pipeline without damaging said lower subsea pipeline,
providing a rotatable connection between said upper pipeline section and said lower subsea pipeline section.

2. The method of claim 1 further comprising unitizing said upper clamp section, said lower clamp section, and said rotatable connection into a pipeline tee.

3. The method of claim 2 further comprising said pipeline tee is lowered to engage said upper subsea pipeline in an upside down orientation relative to the anticipated installed orientation.

4. The method of claim 3 further comprising after said pipeline tee engages said upper subsea pipeline, said pipeline tee is rotated to the anticipated installed orientation.

5. The method of claim 4 further comprising adjusting the angle of said lower clamp section to match the orientation of said lower subsea pipeline.

6. The method of claim 5 further comprising moving said pipeline tee along said upper subsea pipeline to a position above said lower subsea pipeline.

7. The method of claim 6 further comprising lowering said upper subsea pipeline and said pipeline tee to engage said lower clamp section of said pipeline tee with said lower subsea pipeline.

8. The method of claim 1 further comprising providing rollers to said clamp sections to provide the ability to move along said pipelines.

9. The method of claim 8, further comprising said rollers to be profiled to generally conform to the outer circumference of said pipeline.

10. The method of claim 1 further comprising said upper subsea pipeline is the same diameter as said lower subsea pipeline.

11. The method of claim 1 further comprising said upper subsea pipeline is larger than said lower subsea pipeline.

12. The method of claim 1 further comprising said upper subsea pipeline is smaller than said lower subsea pipeline.

13. The method of protecting an upper subsea pipeline and a lower subsea pipeline which cross one another from damaging one another, comprising:
providing a upper clamp section around said upper subsea pipeline which is engaged by contacting said upper subsea pipeline and which is able to move along said upper subsea pipeline without damaging said upper subsea pipeline,
providing a lower clamp section around said lower subsea pipeline which is engaged by lowering against said lower subsea pipeline and which is able to move along said lower subsea pipeline without damaging said lower subsea pipeline,
providing a rotatable connection between said upper pipeline section and said lower subsea pipeline section.

14. The method of claim 13 further comprising unitizing said upper clamp section, said lower clamp section, and said rotatable connection into a pipeline tee.

15. The method of claim 14 further comprising said pipeline tee is lowered to engage said upper subsea pipeline in an upside down orientation relative to the anticipated installed orientation.

16. The method of claim 15 further comprising after said pipeline tee engages said upper subsea pipeline, said pipeline tee is rotated to the anticipated installed orientation.

17. The method of claim 16 further comprising adjusting the angle of said lower clamp section to match the orientation of said lower subsea pipeline.

18. The method of claim 17 further comprising moving said pipeline tee along said upper subsea pipeline to a position above said lower subsea pipeline.

19. The method of claim 17 further comprising lowering said upper subsea pipeline and said pipeline tee to engage said lower clamp section of said pipeline tee with said lower subsea pipeline.

20. The method of claim 13 further comprising providing rollers to said clamp sections to provide the ability to move along said pipelines.

* * * * *